US012529236B2

(12) United States Patent
Wang et al.

(10) Patent No.: US 12,529,236 B2
(45) Date of Patent: Jan. 20, 2026

(54) AUTOMATIC SWIMMING POOL CLEANING ROBOT CAPABLE OF LATERAL TRANSLATION

(71) Applicant: CHASING-INNOVATION TECHNOLOGY CO., LTD., Shenzhen (CN)

(72) Inventors: Si'ao Wang, Shenzhen (CN); Weiwei Li, Shenzhen (CN); Xiaolong Li, Shenzhen (CN); Lanshan Yin, Shenzhen (CN); Zhe Wang, Shenzhen (CN); Chaomin Chen, Shenzhen (CN)

(73) Assignee: CHASING-INNOVATION TECHNOLOGY CO., LTD., Shenzhen (CN)

( * ) Notice: Subject to any disclaimer, the term of this patent is extended or adjusted under 35 U.S.C. 154(b) by 346 days.

(21) Appl. No.: 18/132,947

(22) Filed: Apr. 10, 2023

(65) Prior Publication Data

US 2023/0279685 A1 Sep. 7, 2023

Related U.S. Application Data

(63) Continuation of application No. PCT/CN2022/106504, filed on Jul. 19, 2022.

(30) Foreign Application Priority Data

Mar. 4, 2022 (CN) .......................... 202210205621.8

(51) Int. Cl.
*E04H 4/16* (2006.01)
*E04H 4/12* (2006.01)

(52) U.S. Cl.
CPC ......... *E04H 4/1654* (2013.01); *E04H 4/1218* (2013.01)

(58) Field of Classification Search
CPC .......................... E04H 4/1654; E04H 4/1218
See application file for complete search history.

(56) References Cited

U.S. PATENT DOCUMENTS

2016/0168872 A1 * 6/2016 Hui ...................... E04H 4/1654
134/21

* cited by examiner

*Primary Examiner* — Andrew A Horton

(57) ABSTRACT

An automatic swimming pool cleaning robot capable of lateral translation relates to a technical field of cleaning robots for swimming pools. A controller compartment is disposed in a housing of the automatic swimming pool cleaning robot, the controller compartment is a sealed compartment, and a control circuit is disposed in the controller compartment. A driving motor is disposed in the housing, crawler belts are disposed on both sides of the housing, a cleaning rolling brush is disposed at a bottom of the housing, and the driving motor drives the cleaning rolling brush and the crawler belts through the transmission mechanism. A water inlet is defined at the bottom of the housing, a filtering device is disposed on the water inlet, and the housing covers above the filtering device. Two water outlets are defined at a top of the housing.

9 Claims, 12 Drawing Sheets

AUTOMATIC SWIMMING POOL CLEANING ROBOT CAPABLE OF LATERAL TRANSLATION

TECHNICAL FIELD

The present disclosure relates to a technical field of cleaning robots for swimming pools, and in particular to an automatic swimming pool cleaning robot capable of lateral translation.

BACKGROUND

In order to ensure health of people who use swimming pools, dirt at a bottom and walls of each of the swimming pools needs to be regularly cleaned for reducing possibility that bacteria and harmful substances or suspended matters bred by the bacteria enter digestive tract and respiratory tract of the people who use the swimming pools, thereby guaranteeing the health of the people who use the swimming pools, and meanwhile providing a better user experience. However, cleaning the swimming pools is a time-consuming and labor-consuming work, and currently, most of the swimming pools are manually cleaned, which is long in time consuming, is high in cost, and is difficult to guarantee cleaning quality, meanwhile, a large amount of water resources needs to be consumed. With the popularity of the swimming pools, cleaning the swimming pools is gradually implemented by a machine. Current machines for cleaning the swimming pools have a certain automatic cleaning function, and some of which may move forward and turn in the swimming pools. However, when cleaning the walls of the swimming pools, a machine capable of directly lateral translating is needed, especially for cleaning waterlines.

SUMMARY

The present disclosure aims to provide an automatic swimming pool cleaning robot capable of lateral translation for solving a problem that current swimming pool cleaning machines are difficult to laterally translate.

In order to solve above technical problems, the present disclosure provides an automatic swimming pool cleaning robot capable of lateral translation, including a housing and a housing cover. A controller compartment is disposed in the housing, the controller compartment is a sealed compartment, and a control circuit is disposed in the controller compartment. A driving motor is disposed in the housing body, crawler belts are disposed on both sides of the housing, cleaning rolling brushes are disposed at a bottom of the housing, and the driving motor drives the cleaning rolling brushes and the crawler belts through a driving mechanism. A water inlet is defined at the bottom of the housing, a filtering device is disposed on the water inlet, and the housing covers above the filtering device. Two water outlets are defined at a top of the housing, water flow guide pipes are disposed below the two water outlets, propellers are disposed in the water flow guide pipes, and each of the propellers includes a motor and rotary blades. The water flow guide pipes are oppositely disposed, and the motor of each of the propellers and the driving motor are electrically connected to a control circuit. And lateral translation of the automatic swimming pool cleaning robot by a recoil force of a water flow at the two water outlets is implemented by coinciding an axis of each of the propellers with an axis of each of the water flow guide pipes, defining an included angle between the axis of each of the propellers and an X plane to be 20-45°, and defining an included angle between the axis of each of the propellers and a Y plane to be 20-45°; or, disposing a louver-type grille on each of the two water outlets, defining an included angle between the louver-type grille and the X plane to be 25-55°, and defining an included angle between the louver-type grille and the Y plane to be 25-55°; or, disposing each of the water flow guide pipes in the housing or extending the water flow guide pipes to an external portion of the housing through the two water outlets, defining an included angle between a tail end axis and the X plane to be 20-45°, and defining an included angle between the tail end axis and the Y plane to be 20-45°; or, connecting each of the water flow guide pipes to a servo through a hose, defining an included angle between an axis of the servo and the X plane to be 20-45°, and defining an included angle between the axis of the servo and the Y plane to be 20-45°.

Furthermore, water level sensors are disposed at both a front end and a rear end of the housing.

Furthermore, a pressure sensor is disposed on the control circuit, and an air detection hole is defined on a top of the controller compartment.

Furthermore, a watertight plug connector is disposed on the housing, the controller compartment is electrically connected to a first end of the watertight plug connector, and a second end of the watertight plug connector is connected to a control terminal through a cable.

Furthermore, the cable includes a rotating cable, a rotor, a stator, a fixed cable, and a slip ring housing. The stator includes a stator base and a first printed circuit board (PCB), the first PCB is disposed at a bottom of the stator base, and conductive ejector pins are disposed at a bottom of the first PCB. A fixed cable is sealingly disposed in the stator base, a first end of the fixed cable penetrates out of the stator and is connected to the control terminal, a second end of the fixed cable is electrically connected to the conductive ejector pins. The rotor includes a rotor base, a second PCB, and a rotor limiting member. The second PCB is disposed on a top of the rotor base, conductive slideways are disposed on a top of the second PCB. A connecting member is sealingly disposed in the rotor base, the rotor limiting member is sealingly disposed at an end portion of the connecting member, the rotating cable is sealingly disposed in the connecting member, a first end of the rotating cable is electrically connected to the conductive slideways, a second end of the rotating cable penetrates out of the rotor limiting member and is connected to the watertight plug connector. The stator and the rotor are coaxially disposed, the conductive ejector pins are in contact with the conductive slideways, the slip ring housing is sleeved on outer walls of the stator and the rotor, the slip ring housing is sealingly and fixedly connected to the stator, and the slip ring housing is sealingly and rotatably connected to the rotor.

Furthermore, the connecting member is filled with a filing material, and the stator base and the fixed cable are sealed through filing glue.

Furthermore, the rotor limiting member is in a straight tube shape, and a top of the rotor limiting member extends outward and bends to form limiting clamping jaws, outer walls of the limiting clamping jaws are matched with an inner wall of the slip ring housing.

Furthermore, the driving motor includes two driving motors, the two driving motors are respectively disposed at two sides of the controller compartment, and the two driving motors respectively drive the crawler belts.

Furthermore, the louver-type grille is disposed on each of the two water outlets.

According to a working principle, when the automatic swimming pool cleaning robot capable of lateral translation works, the automatic swimming pool cleaning robot is driven by the driving motor to move on a bottom and walls of a swimming pool, adheres dirt at the bottom and the walls of the swimming pool through the cleaning rolling brushes, and enters water in the swimming pool to combine the dirt with the water to become sewage. Under an action of the propellers, a pressure of a cavity in the housing is reduced, the sewage enters the housing of the automatic swimming pool cleaning robot through the water inlet and is filtered through the filtering device to be clear water, and the clear water enters the swimming pool through the two water outlets after flowing through the water flow guide pipes.

When the automatic swimming pool cleaning robot works at the bottom of the swimming pool, a rotating speed of the motor of each of the propellers is consistent, a reaction force of the water flow at the two water outlets is decomposed and combined, a pressure on the automatic swimming pool cleaning robot is mainly a pressure perpendicular to the bottom of swimming pool and downward, and a pushing force consistent with an advancing direction. The pressure enables the automatic swimming pool cleaning robot to be pressed closer to the bottom of the swimming pool, so that a cleaning effect of the cleaning rolling brushes is improved, and a driving force assists the driving motor to drive the crawler belts to move, and when speeds of the crawler belts on both sides of the housing are different, the automatic swimming pool cleaning robot is achieved to turn to other directions.

When the automatic swimming pool cleaning robot works on the walls of the swimming pool, and moves up and down along the walls of the swimming pool, the rotating speed of the motor of each of the propellers is consistent, the reaction force of the water flow at the two water outlets is decomposed and combined, the pressure on the automatic swimming pool cleaning robot is mainly a pressure perpendicular to each of the walls of the swimming pool and downward, and a pushing force consistent with an advancing direction. The pressure enables the automatic swimming pool cleaning robot to be pressed more close to the walls of the swimming pool, so that a cleaning effect of the cleaning rolling brushes is improved, meanwhile, the crawler belts provide a friction force to be convenient for the automatic swimming pool cleaning robot to climb along the walls of the swimming pool, and a driving force assists the driving motor to drive the crawler belts to move. When the automatic swimming pool cleaning robot needs to move leftward and rightward along the walls of the swimming pool, that is, needs to laterally move, one of the propellers rotates at a high speed, another one of the propellers rotates at a low speed or does not rotate, and the reaction force of the water flow at the two water outlets is decomposed and combined, the pressure on the automatic swimming pool cleaning robot is mainly a pressure perpendicular to each of the walls of the swimming pool and downward, and a pushing force to a left side or a right side. The pressure enables the automatic swimming pool cleaning robot to be pressed more close to the walls of the swimming pool, so that a cleaning effect of the cleaning rolling brushes is improved, meanwhile, the crawler belts provide the friction force to be convenient for the automatic swimming pool cleaning robot to climb along walls of the swimming pool, and a driving force drives the automatic swimming pool cleaning robot to move leftward or rightward.

Compared with the prior art, the beneficial effect of the present disclosure is as following. According to the automatic swimming pool cleaning robot capable of lateral translation of the present disclosure, the propellers are oppositely disposed to achieve cleaning operation of the automatic swimming pool cleaning robot capable of lateral translation at the bottom and the walls of the swimming pool. The recoil force of the water flow at the two water outlets is controlled to achieve the lateral translation of the automatic swimming pool cleaning robot, which is convenient for cleaning waterlines. After the water level sensors at the front end reach a certain position above the waterlines, the automatic swimming pool cleaning robot starts to clean the waterlines of the swimming pool, and cleaning the waterlines is completed through the lateral translation of the automatic swimming pool cleaning robot. The pressure sensor is disposed in the controller compartment, and air tightness of the controller compartment is detected through air pressure using the air detection hole.

Figure 1:
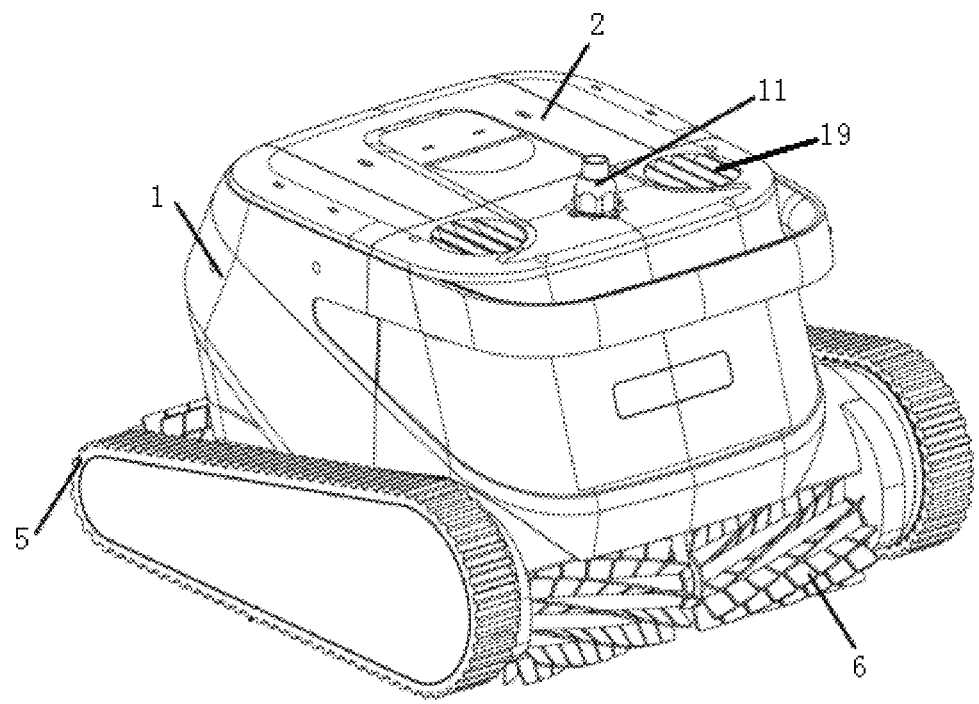
FIG. 1 is a schematic diagram of an overall structure of an automatic swimming pool cleaning robot capable of lateral translation according to the present disclosure.

Numerals in the drawings: 1. housing; 101. water inlet; 102. water outlet; 2. housing cover; 3. controller compartment; 4. driving motor; 5. crawler belts; 6. cleaning rolling brush; 7. filtering device; 8. water flow guide pipe; 9. propeller; 10. air detection hole; 11. watertight plug connector; 12. cable; 13. rotating cable; 14. rotor; 1401. rotor base; 1402. second printed circuit board; 1403. rotor limiting member; 1404. conductive slideway; 1405. limiting clamping jaw; 1406. convex ring; 15. stator; 1501. stator base; 1502. first printed circuit board; 1503. conductive ejector pin; 16. fixed cable; 17. connecting member; 18. slip ring housing; 19. louver-type grille; 20. lip-shaped sealing ring; 21. O-shaped sealing ring; 22. automatic swimming pool cleaning robot capable of lateral translation; 23. control terminal; 24. sealing glue; 25. hose; and 26. servo.

DETAILED DESCRIPTION

In order to make objectives, technical solutions, and advantages of the present disclosure clearer, the present disclosure is further described in detail below with reference to accompanying drawings and embodiments. It should be understood that specific embodiments described herein are merely used to explain the present disclosure, and are not intended to limit the present disclosure.

In the present disclosure, a front end refers to an end close to the front when an automatic swimming pool cleaning robot capable of lateral translation moves forward, and is an end having a larger diameter of each of crawler belt wheels; an X plane is a plane perpendicular to a bottom surface of a housing and also a plane where center lines of two propellers are located; and a Y plane is a plane perpendicular to the bottom surface of the housing and perpendicular to the X plane.

Figure 2:
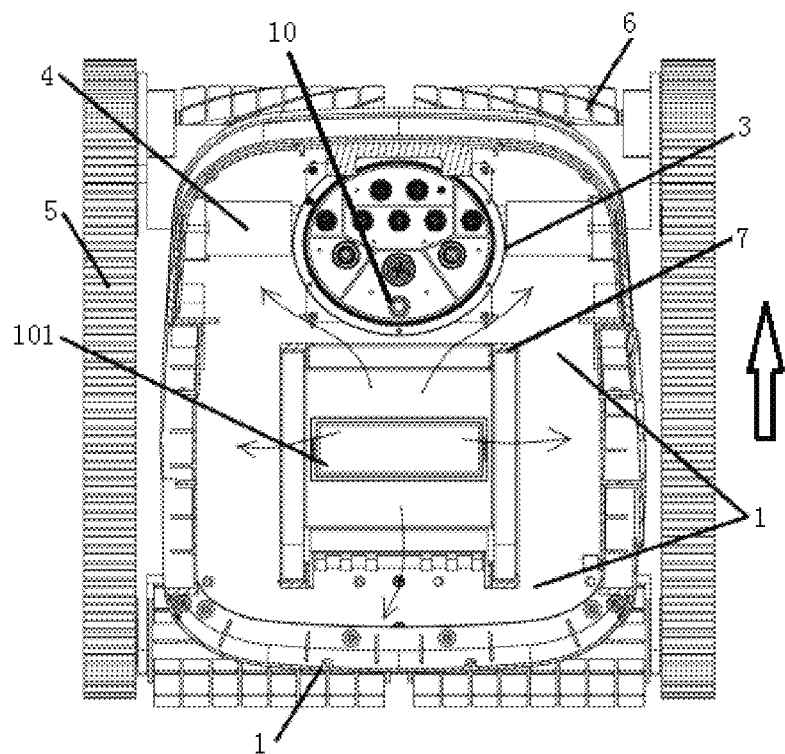
FIG. 2 is a schematic diagram of a top view of the automatic swimming pool cleaning robot capable of lateral translation according to the present disclosure, where a housing cover and a part of a housing are omitted.

As shown in FIGS. 1-2, the present disclosure provides an automatic swimming pool cleaning robot capable of lateral translation, including a housing 1 and a housing cover 2, the housing 1 is a hollow cavity having an opening in a rear end of the top, a controller compartment 3 is disposed in the housing 1 close to a front end of the housing 1, the controller compartment 3 is a sealed compartment body, and a control circuit is disposed in the controller compartment 3. Two driving motors 4 are oppositely disposed on two sides of the controller compartment, the two driving motors 4 control crawler belts 5 on both sides of the housing 1 through a transmission mechanism, meanwhile, the transmission mechanism drives cleaning rolling brushes 6 disposed at a bottom of the housing 1. The cleaning rolling brushes are respectively disposed at a front end and a rear end. The two driving motors 4 enable the crawler belts 5 to maintain different speeds, which is convenient for the automatic swimming pool cleaning robot capable of lateral translation to turn to other directions.

Figure 3:
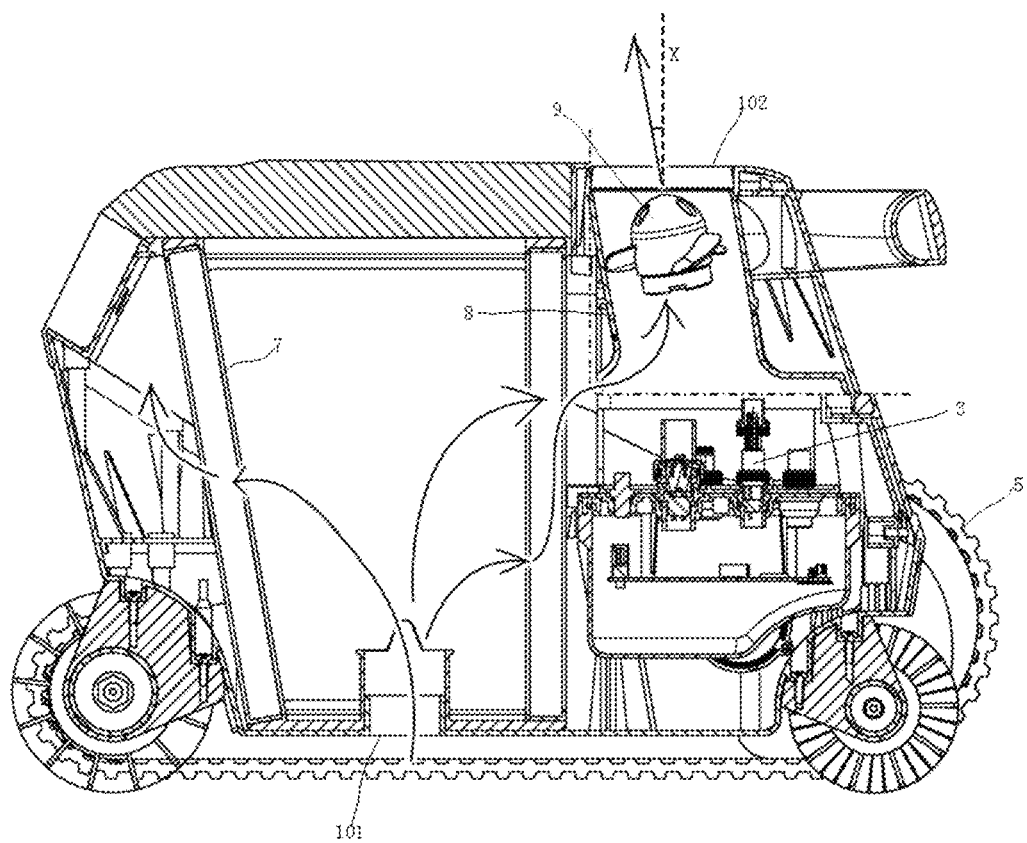
FIG. 3 is a schematic diagram of an internal structure of a Y plane according to the present disclosure.
Figure 4:
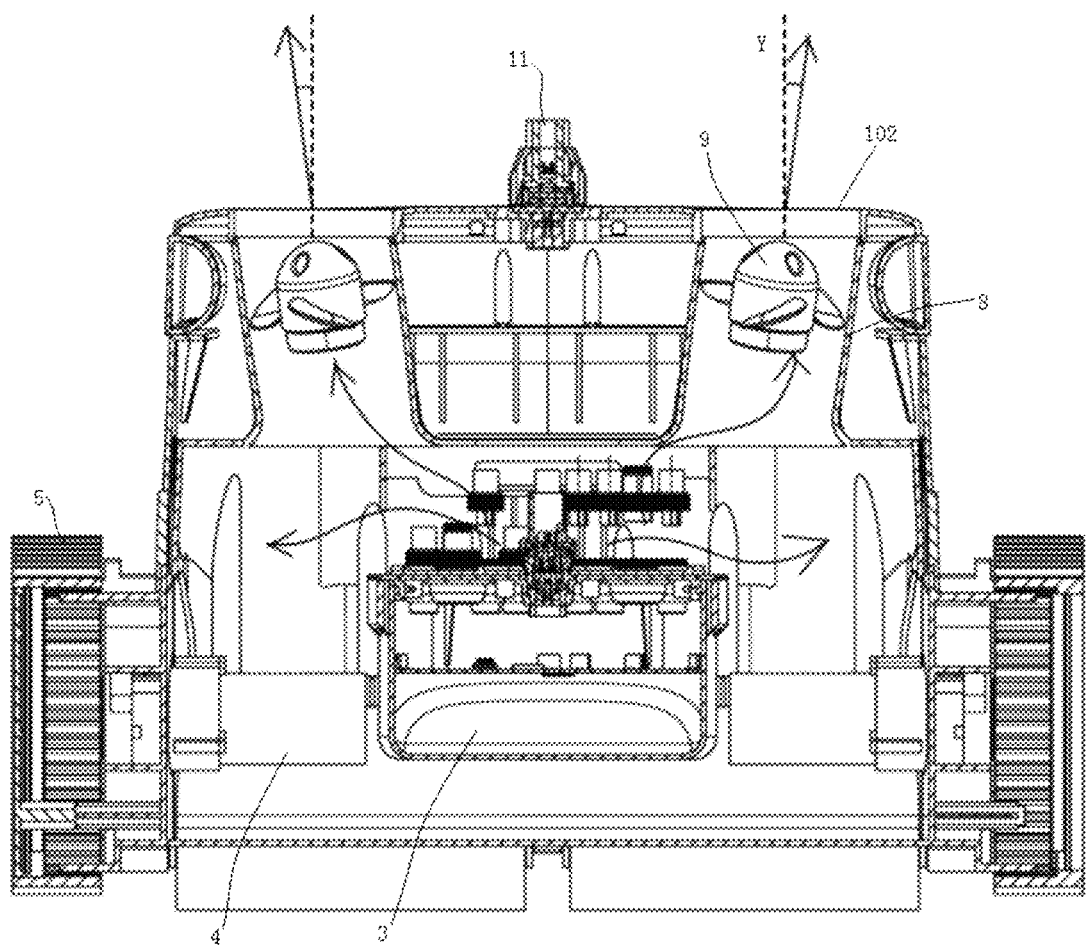
FIG. 4 is a schematic diagram of an internal structure of an X plane according to the present disclosure.

A water inlet is defined at a rear end of the bottom of the housing 1, a filter device 7 is disposed, a filtering device 7 is pressed and disposed on the water inlet 101, filtering screens are disposed at four sides of the filtering device 7, a hollow cavity is defined in a middle of the filtering device 7, and the housing cover 2 covers above the filtering device 7 and is fixedly connected to the housing 1. Two water outlets 102 are defined at the top of the housing 1 close to the front end, water flow guide pipes 8 are disposed below the two water outlets 102, propellers 9 are disposed in the water flow guide pipes 8, and each of the propellers 9 includes a motor and rotary blades, the water flow guide pipes 8 are oppositely disposed, an axis of each of the propellers 9 coincides with an axis of each of the water flow guide pipes 8. An included angle between the axis of each of the propellers 9 and the X plane is 20-45°, and an included angle between the axis of each of the propellers 9 and the Y plane is 20-45° (first method), as shown in FIGS. 3 and 4. The motor of each of the propellers and the driving motor are electrically connected to the control circuit. In order to minimize interference caused by the recoil force generated by the water flow, a louver-type grille is disposed on each of the water outlets, and a blade direction of the louver-type grille is matched with an axis direction of each of the propellers 9. The louver-type grille further plays a role in protection, which may prevent hands of an operator from directly contacting the propellers 9, so that injury may be avoided.

The louver-type grille further prevents the propellers 9 from being wound by the dirt in the water, thereby preventing a service life of the propellers from being affected.

In order to facilitate cleaning of the waterlines, water level sensors are disposed at a front end and a rear end of the housing 1. When one of the water level sensors at the front end is exposed out of a water surface, and another one of the water level sensors at the rear end is below the water surface, the automatic swimming pool cleaning robot capable of lateral translation is directly located at a position of the waterlines. At this time, cleaning the waterlines is started, the automatic swimming pool cleaning robot remains relatively stationary, the cleaning rolling brushes 6 clean the waterlines, and the cleaning the waterlines is completed after a certain period of time, the automatic swimming pool cleaning robot laterally moves and repeats above motions.

In order to detect watertight of the controller compartment 3, a pressure sensor is disposed on the control circuit, an air detection hole 10 is defined at a top of the controller compartment 3. Inflation or air extraction are performed in the controller compartment 3 through the air detection hole 10, and then pressure in the controller compartment 3 is maintained, and air tightness of the controller compartment 3 is monitored through the pressure sensor after the air tightness reaches a standard. Then, the air detection hole 10 is sealed with filing glue, thereby avoiding cumbersome detection caused by placing the controller compartment 3 into the water in the swimming pool for detecting sealing performance and further avoiding a situation that the water enters the controller compartment 3 to scrap the whole controller compartment 3 when the sealing performance is poor.

In order to enable an operator to control the automatic swimming pool cleaning robot in real time on a poolside or to use the control terminal 23 to supply power to the automatic swimming pool cleaning robot and prolong an operation time of the automatic swimming pool cleaning robot, a watertight plug connector 11 is disposed on the housing 1, the controller compartment 3 is electrically connected to a first end of the watertight plug connector 11, and a second end of the watertight plug connector 11 is connected to the control terminal 23 through a cable 12.

When the automatic swimming pool cleaning robot capable of lateral translation works, the automatic swimming pool cleaning robot is driven by the driving motor 4 to move on a bottom and walls of a swimming pool, adheres dirt at the bottom and the walls of the swimming pool through the cleaning rolling brushes 6, and enters water in the swimming pool to combine the dirt with the water to become sewage. Under an action of the propellers 9, a pressure of a cavity in the housing 1 is reduced, the sewage enters the housing 1 of the automatic swimming pool cleaning robot through the water inlet 101 and is filtered through the filtering device 7 to be clear water, and the clear water enters the swimming pool through the two water outlets 102 after flowing through the water flow guide pipes 8.

When the automatic swimming pool cleaning robot works at the bottom of the swimming pool, a rotating speed of the motor of each of the propellers 9 is consistent, a reaction force of each of the propellers 9 (the recoil force of the water flow at the two water outlets 102) is decomposed and combined, a pressure on the automatic swimming pool cleaning robot is mainly a pressure perpendicular to the bottom of the swimming pool and downward, and a pushing force consistent with an advancing direction. The pressure enables the automatic swimming pool cleaning robot to be pressed closer to the bottom of the swimming pool, so that a cleaning effect of the cleaning rolling brushes 6 is improved, and a driving force assists the driving motor 4 to drive the crawler belts 5 to move, and when speeds of the crawler belts 5 on both sides of the housing are different, the automatic swimming pool cleaning robot is achieved to turn to other directions.

When the automatic swimming pool cleaning robot works on the walls of the swimming pool, and moves up and down along the walls of the swimming pool, the rotating speed of the motor of each of the propellers 9 is consistent, the reaction force of the water flow at the two water outlets is decomposed and combined, the pressure on the automatic swimming pool cleaning robot is mainly a pressure perpendicular to each of the walls of the swimming pool and downward, and a pushing force consistent with an advancing direction. The pressure enables the automatic swimming pool cleaning robot to be pressed closer to the walls of the swimming pool, so that a cleaning effect of the cleaning rolling brushes 6 is improved, meanwhile, the crawler belts 5 provide a friction force to be convenient for the automatic swimming pool cleaning robot to climb along the walls of the swimming pool, and a driving force assists the driving motor to drive the crawler belts 5 to move.

Figure 10:
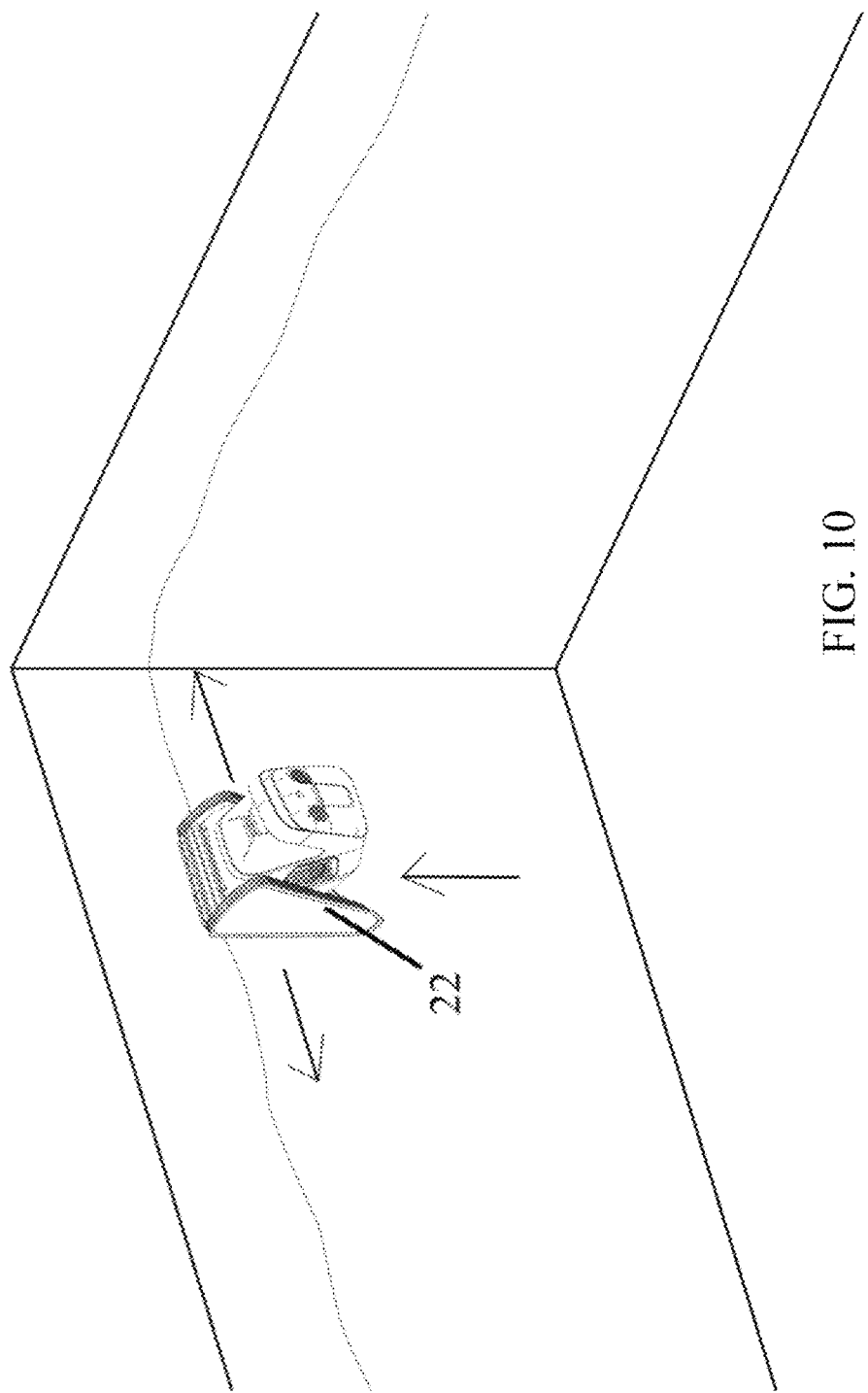
FIG. 10 is a schematic diagram of the automatic swimming pool cleaning robot capable of lateral translation according to the present disclosure, where the automatic swimming pool cleaning robot capable of lateral translation works under water.

When the automatic swimming pool cleaning robot needs to laterally move along the walls of the swimming pool, as shown in FIG. 10, one of the propellers 9 rotates at a high speed, another one of the propellers 9 rotates at a low speed or does not rotate, and the reaction force of the water flow at the two water outlets is decomposed and combined, the pressure on the automatic swimming pool cleaning robot is mainly a pressure perpendicular to each of the walls of the swimming pool and downward, and a pushing force to a left side or a right side. The pressure enables the automatic swimming pool cleaning robot to be pressed closer to the walls of the swimming pool, so that a cleaning effect of the cleaning rolling brushes is improved, meanwhile, the crawler belts provide the friction force to be convenient for the automatic swimming pool cleaning robot to climb along walls of the swimming pool, and a driving force drives the automatic swimming pool cleaning robot to move leftward or rightward or move laterally.

Methods for achieving lateral translation of the automatic swimming pool cleaning robot are multiple, and in addition to the above method, there are other methods for controlling the recoil force of the water flow at the water outlets 102 to achieve the lateral translation.

Figure 11:
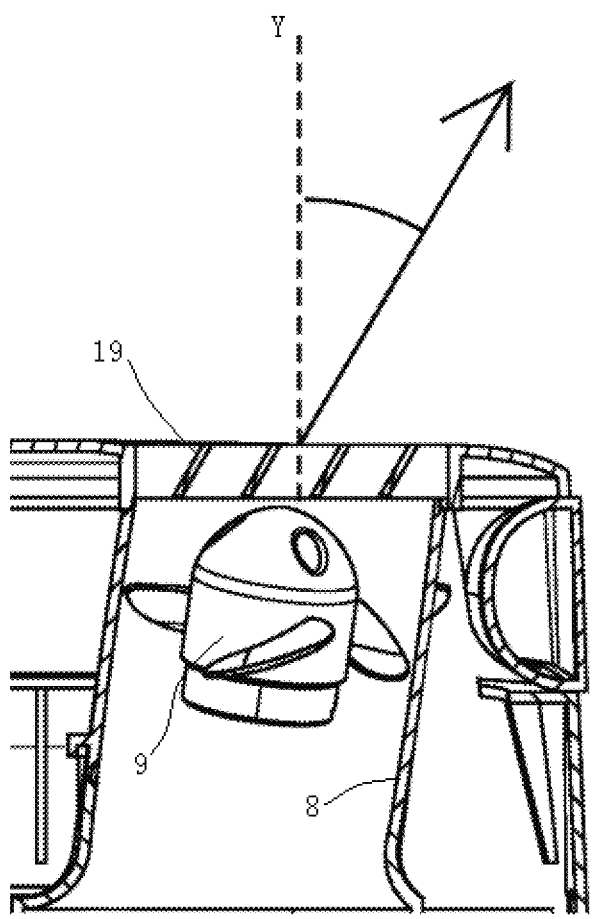
FIG. 11 is a schematic diagram of assembly of a louver-type grille.

As shown in FIG. 11, the louver-type grille 19 is disposed on each of the two water outlets 102, an included angle between the louver-type grille 19 and the X plane is 25-55°, and an included angle between the louver-type grille 19 and the Y plane is 25-55°. Meanwhile, a direction of the recoil force is similar with an effect that the propellers 9 are inclined as indicated in the first method.

Figure 12:
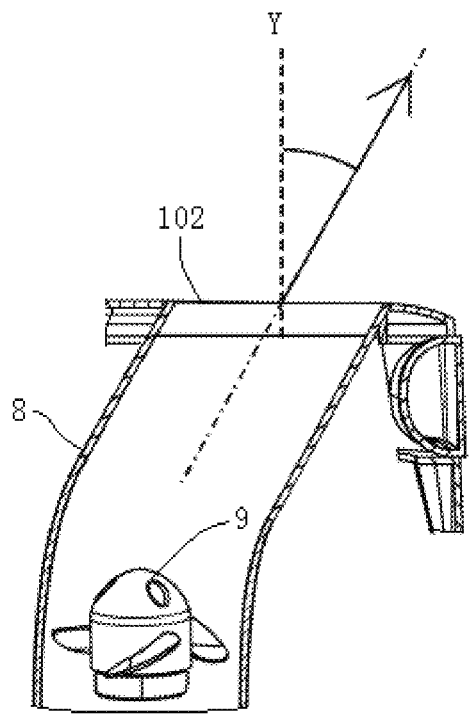
FIG. 12 is a schematic diagram of a first embodiment of a structure of a water flow guide pipe.
Figure 13:
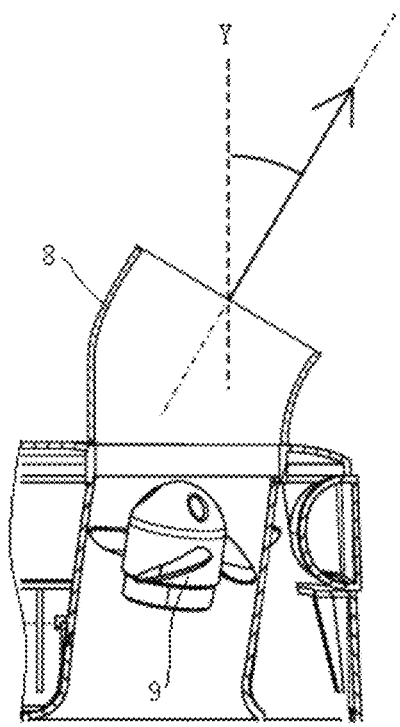
FIG. 13 is a schematic diagram of a second embodiment of the structure of the water flow guide pipe.
Figure 14:
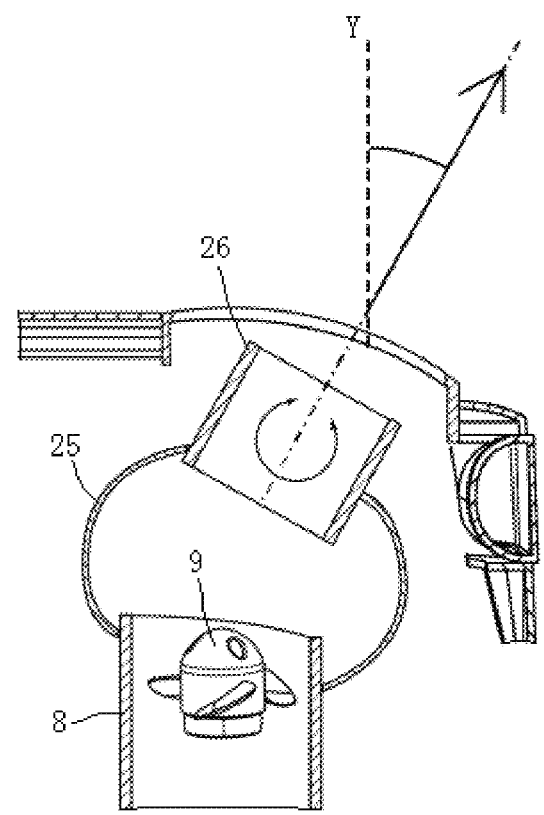
FIG. 14 is a schematic diagram of assembly of the water flow guide pipe and the servo.

Further, as shown in FIG. 12, each of the water flow guide pipes 8 includes a vertical section and an inclined section, and is disposed in the housing 1, and the propellers 9 are disposed in the vertical section. An included angle between an axis of the inclined section and the X plane is 20-45°, an included angle between the axis of the inclined section and the Y plane is 20-45°. Or, as shown in FIG. 13, each of the water flow guide pipes 8 includes a vertical section and an inclined section, the vertical section extends to an external portion of the housing 1 through the two water outlets 102. An included angle between an axis of the inclined section and the X plane is 20-45°, an included angle between the axis of the inclined section and the Y plane is 20-45°. Or, as shown in FIG. 14, each of the water flow guide pipes 8 is vertically disposed in each of the propellers 9, a tail end of each of the water outlets 102 is connected to a servo 26 through a hose 25. An included angle between an axis of the servo 26 and the X plane is 20-45°, an included angle between the axis of the servo 26 and the Y plane is 20-45°, which has the same effect that the propellers 9 are inclined as indicated in the first method.

During a test process, the automatic swimming pool cleaning robot is kept laterally moving in the waterlines of the swimming pool. When the automatic swimming pool cleaning robot laterally moves, one of the propellers 9 does not rotate, and another one of the propellers 9 has a rotate speed of 3750 revolutions per minute (rpm), a shaft power of 125.6 W, and a rate of inflow of the automatic swimming pool cleaning robot is 9.33 kg/s. On the base of above, a rate of the lateral translation of the automatic swimming pool cleaning robot in different methods and angles are shown in the following table.

| Angle (°) | 20 | 25 | 30 | 35 | 40 | 45 | 50 | 55 |
|---|---|---|---|---|---|---|---|---|
| First method | 25.3 | 31.2 | 36.3 | 42 | 46.1 | 51.3 | / | / |
| Second method | / | 26 | 29 | 33.7 | 37 | 40.5 | 45.8 | 48.9 |
| Third method | 24.8 | 30.7 | 36.5 | 40.7 | 45.7 | 51.1 | / | / |
| Fourth method | 24.1 | 29.8 | 35.1 | 39.3 | 44.9 | 50.1 | / | / |

Figure 5:
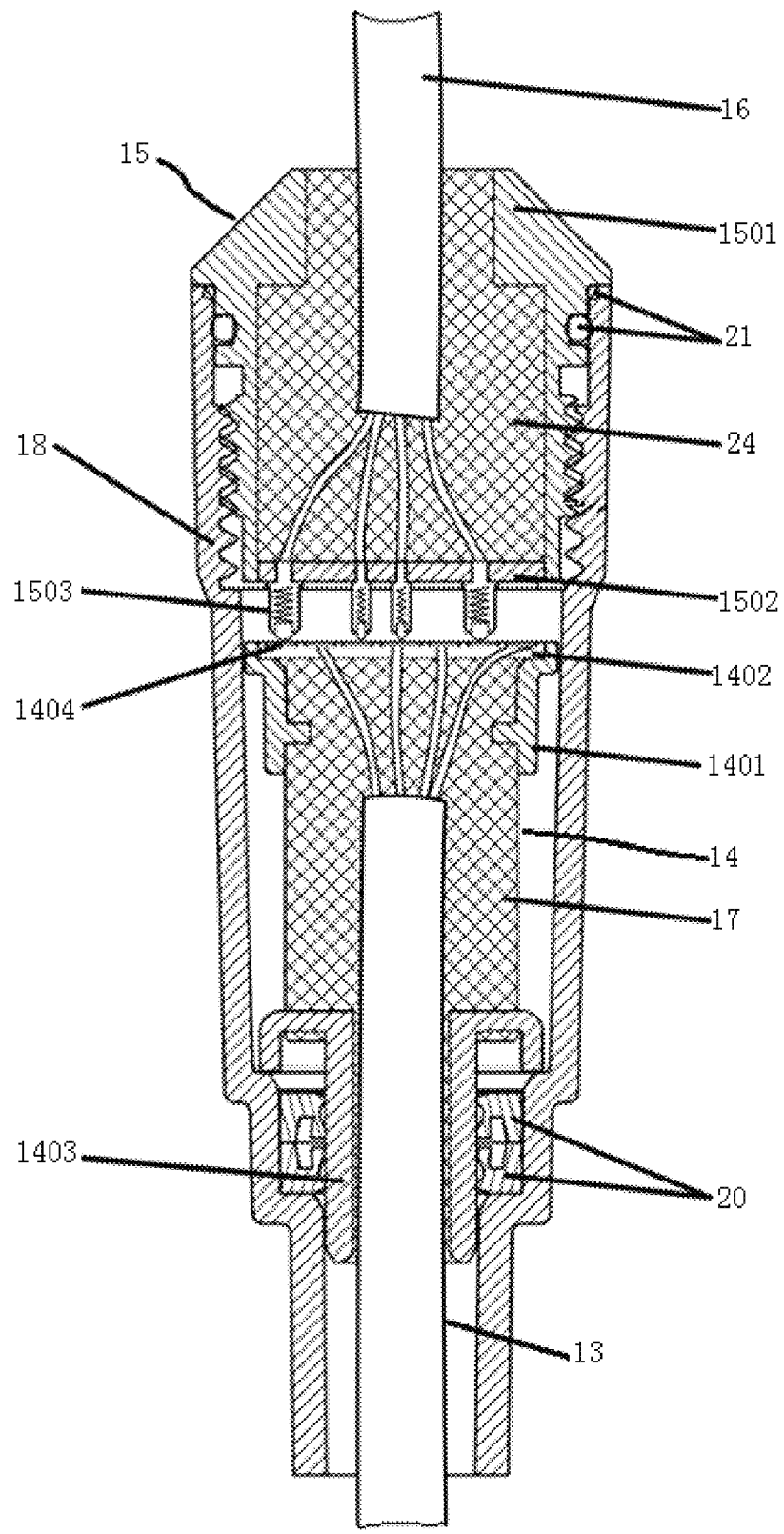
FIG. 5 is a schematic diagram of an internal structure of a cable according to the present disclosure.
Figure 6:
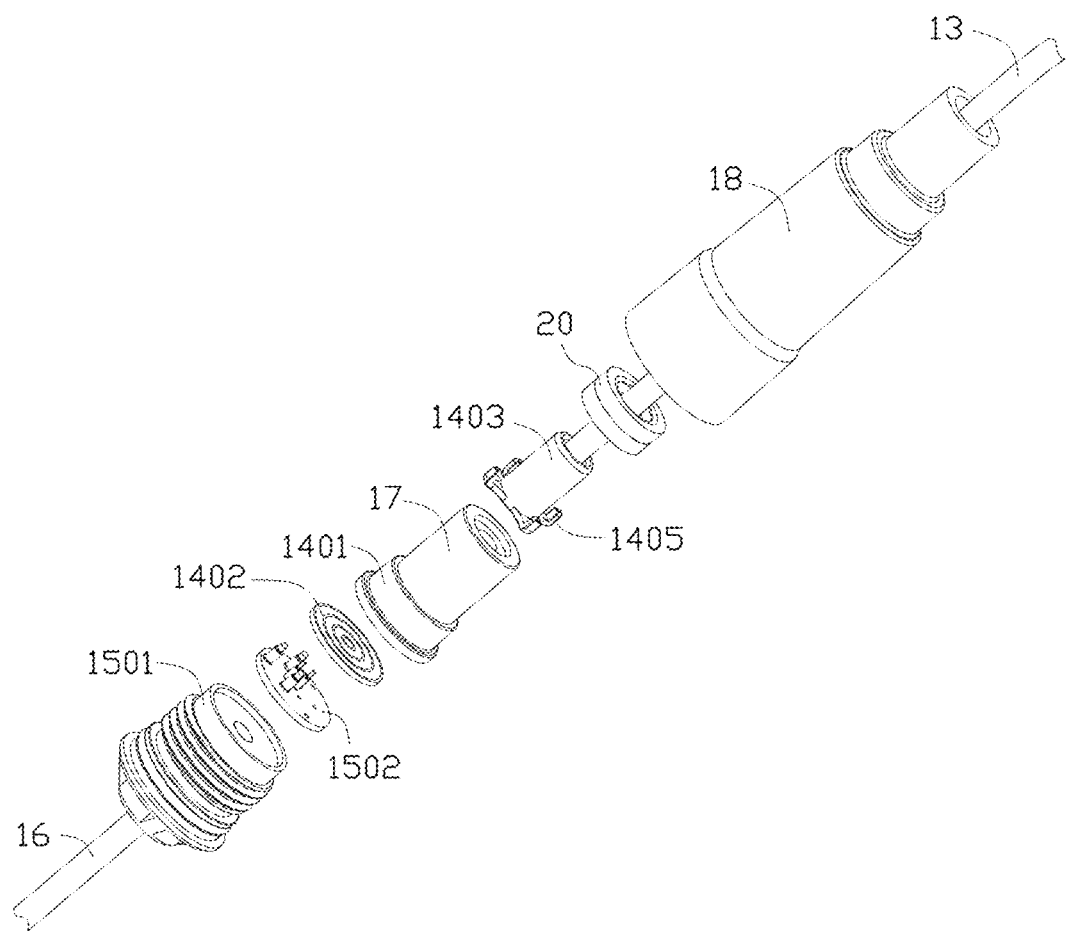
FIG. 6 is a schematic diagram of assembly of the cable according to the present disclosure.
Figure 7:
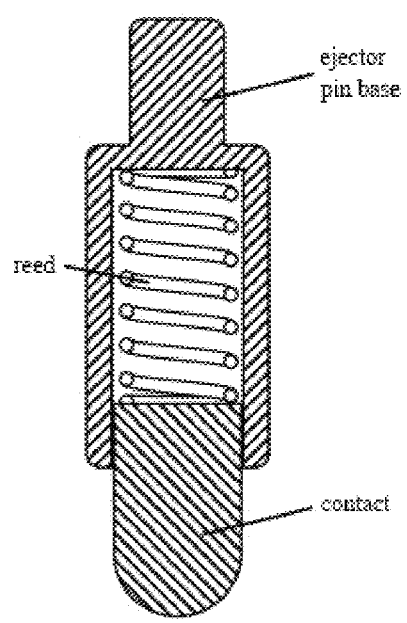
FIG. 7 is a schematic diagram of a structure of a conductive ejector pin according to the present disclosure.

In order to prevent the cable from being wound or twisted, FIGS. 5 and 6 illustrate an anti-winding cable for the automatic swimming pool cleaning robot, including a rotating cable 13, a rotor 14, a stator 15, a fixed cable 16, and a slip ring housing 18. The stator 15 includes a stator base 1501 and a first printed circuit board (PCB) 1502, the first PCB 1502 is disposed at a bottom of the stator base 1501, and conductive ejector pins 1503 are disposed at a bottom of the first PCB 1502. A fixed cable 16 is sealingly disposed in the stator base 1501, a first end of the fixed cable 16 penetrates out of the stator 15 and is connected to the control terminal 23, a second end of the fixed cable 16 is electrically connected to the conductive ejector pins 15. In order to ensure a more effective sealing effect, an assembling gap between the stator base 1501 and the fixed cable 16 and an assembling gap between the stator base 1501 and the first PCB 1502 are sealed using the filing glue. A structure of one of the conductive ejector pins 1503 is as shown in FIG. 7, including an ejector pin base, a reed, and a contact. An end portion of the ejector pin base is fixed on the first PCB 1502, a first end of the reed is welded in a U-shaped groove of the ejector pin base, and a second end of the reed is welded with the contact.

The rotor 14 includes a rotor base 1401, a second PCB 1402, and a rotor limiting member 1403. The second PCB 1402 is disposed on a top of the rotor base 1401, conductive slideways 1404 are disposed on a top of the second PCB 1402. A connecting member 17 is sealingly disposed in the rotor base 1401, the rotor limiting member 303 is sealingly disposed at an end portion of the connecting member 17, the rotating cable 5 is sealingly disposed in the connecting member 6, a first end of the rotating cable 5 is electrically connected to the conductive slideways 1404, a second end of the rotating cable 5 penetrates out of the rotor limiting member 1403 and is connected to the watertight plug connector 11. In order to make the sealing more reliable, the connecting member 17 is filled with a filing material. Specifically, the filing material may be injection molding material, and the connecting member 17 is filled with the injection molding material in cooperation with a mold, so that the connecting member 17 has certain hardness and strength, and has a sealing effect on the rotating cable 5.

After assembling the stator 15 and the rotor 14, the stator 15 and the rotor 14 are coaxially disposed, the conductive ejector pins 1503 are in contact with the conductive slideways 1404, the slip ring housing 18 is sleeved on outer walls of the stator 15 and the rotor 14, the slip ring housing 18 is sealingly and fixedly connected to the stator 15, and the slip ring housing 18 is sealingly and rotatably connected to the rotor 14. The slip ring housing 18 is connected to the stator 15 through threads, and O-shaped sealing rings 21 in an axial direction and a radial direction may be respectively sealed on outer sides of the stator base 1501.

In order to facilitate assembly of the rotor 14, the rotor base may be a straight tube shape, and a positioning step is disposed in an end portion of the rotor base 1401, the second PCB 1402 is disposed in the positioning step, and an outer side wall of the positioning step is matched with an inner wall of the slip ring housing 18, so that when the rotor 14 rotates, the positioning step is in contact with the inner wall of the slip ring housing 18 to limit a rotation range of the slip ring housing 18, thereby keeping the conductive ejector pins 1503 and the conductive slideways 1404 in a good contact. On the other hand, in order to make filing and assembling effects of the connecting member 17 better, the rotor base 1401 may protrude inward to form the convex ring 1406 for further fixing the filing material, thereby prolonging a service life of the rotor base 1401.

Figure 8:
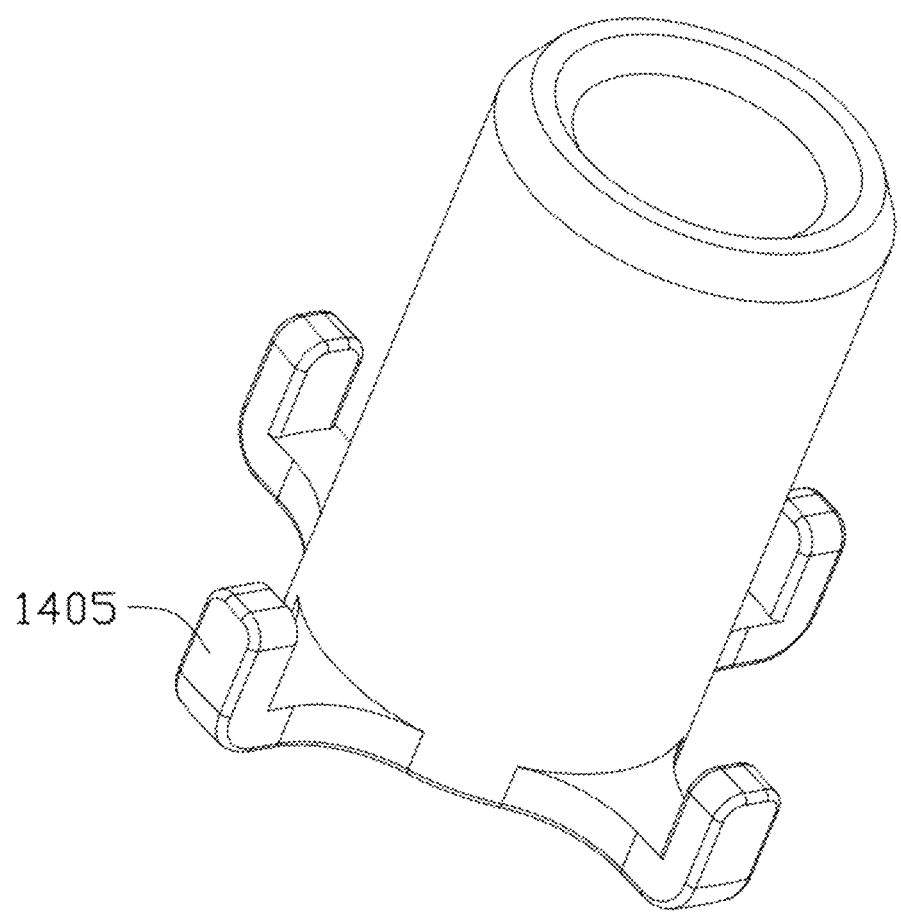
FIG. 8 is a schematic diagram of a rotor limiting member according to the present disclosure.

In order to make rotation of the rotor 14 stable, as shown in FIG. 8, the rotor limiting member 1403 may be a straight tube shape, and a top of the rotor limiting member 1403 extends outward and bends to form limiting clamping jaws 1405, outer walls of the limiting clamping jaws 1405 are matched with the inner wall of the slip ring housing 18, and a bottom of each of the limiting clamping jaws 1405 is pressed against a step on the inner wall of the slip ring housing 18. When the rotor 14 rotates, except that the positioning step of the rotor base 1401 is in contact with an inner wall of the slip ring housing 18, an outer wall of each of the limiting clamping jaws 1405 is also in contact with the inner wall of slip ring housing 18, thereby further limiting a rotation range of the rotor 14 and making the rotation of the rotor 14 more stable. Meanwhile, the limiting clamping jaws 1405 further limit axial movement of the rotor 14. Lip-shaped sealing rings 20 are sleeved on outer sides of a tube wall of the rotor limiting member 1403 for sealing the rotor limiting member 1403 and the housing 1, the lip-shaped sealing rings 20 are two lip-shaped sealing rings 20 oppositely disposed, and an outer diameter of each of the lip-shaped sealing rings 20 is matched with an inner diameter of the slip ring housing 18.

Figure 9:
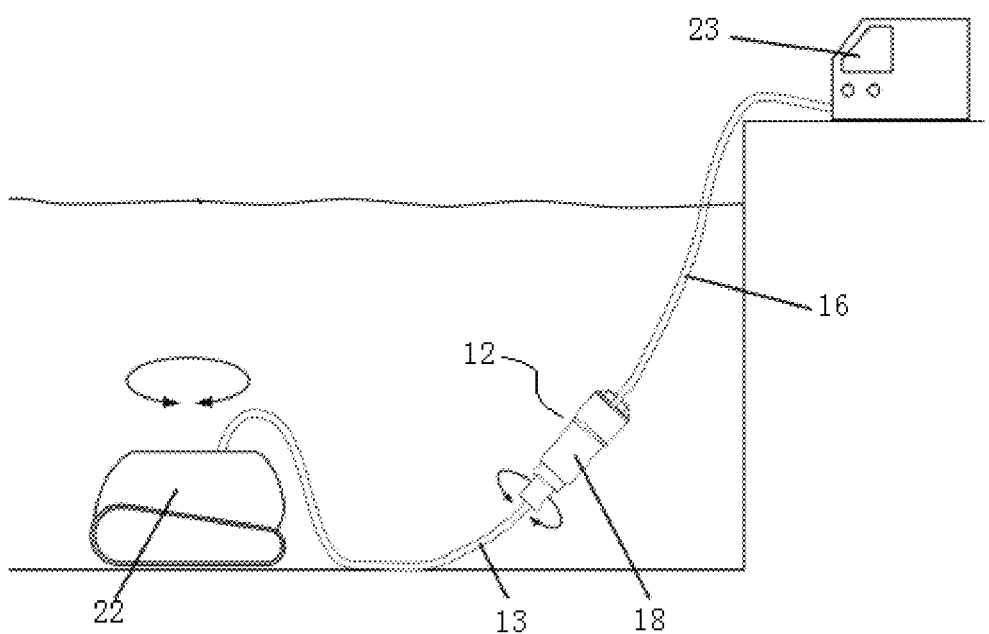
FIG. 9 is a schematic diagram of a use state of the cable according to the present disclosure.

When the automatic swimming pool cleaning robot is in use, as shown in FIG. 9, the cable connects the automatic swimming pool cleaning robot 22 and the control terminal 23, and when the automatic swimming pool cleaning robot 22 works under the water and the cable is wound or rotated due to motions of turning, overturning, etc., a running trend that the rotating cable 13 and a fixed cable 16 relatively rotate occurs, and when the rotating cable 13 and the fixed cable 16 are stressed to rotate, the rotating cable 13 drives the rotor 14 to rotate in the slip ring housing 18. Meanwhile, the conductive ejector pins 1503 slide on the conductive slideways 1404 for ensuring that the rotating cable 13 and the fixed cable 16 are kept in a conductive state.

Although the present disclosure is described herein with reference to a plurality of illustrative embodiments of the present disclosure, it should be understood that many other modifications and embodiments may be devised by those skilled in the art, which modifications and embodiments fall within principles and spirit of the present disclosure. More specifically, within scopes of the present disclosure, drawings, and claims of the present disclosure, various modifications and improvements may be made to the constituent components or layouts of the subject combination layout. Other uses are apparent to those skilled in the art in addition to variations and modifications to the constituent parts or layouts.

What is claimed is:

1. An automatic swimming pool cleaning robot capable of lateral translation, comprising:
   a housing; and
   a housing cover;
   wherein a controller compartment is disposed in the housing, the controller compartment is a sealed compartment, and a control circuit is disposed in the controller compartment; a driving motor is disposed in the housing body, crawler belts are disposed on two sides of the housing, cleaning rolling brushes are disposed at a bottom of the housing, and the driving motor drives the cleaning rolling brushes and the crawler belts through a driving mechanism; a water inlet is defined at the bottom of the housing, a filtering device is disposed on the water inlet, and the housing covers above the filtering device; two water outlets are defined at a top of the housing, water flow guide pipes are disposed below the two water outlets, propellers are disposed in the water flow guide pipes, and each of the propellers comprises a motor and rotary blades; the water flow guide pipes are oppositely disposed, and the motor of each of the propellers and the driving motor are electrically connected to a control circuit; and lateral translation of the automatic swimming pool cleaning robot by a recoil force of a water flow at the two water outlets is implemented by:
   coinciding an axis of each of the propellers with an axis of each of the water flow guide pipes, defining an included angle between the axis of each of the propellers and an X plane to be 20°-45°, and defining an included angle between the axis of each of the propellers and a Y plane to be 20°-45°; or
   disposing a louver-type grille on each of the two water outlets, defining an included angle between the louver-type grille and the X plane to be 25°-55°, and defining an included angle between the louver-type grille and the Y plane to be 25°-55°; or
   disposing the water flow guide pipes in the housing or extending the water flow guide pipes to an external portion of the housing through the two water outlets, defining an included angle between a tail end axis and the X plane to be 20°-45°, and defining an included angle between the tail end axis and the Y plane to be 20°-45°; or
   connecting each of the water flow guide pipes to a servo through a hose, defining an included angle between an axis of the servo and the X plane to be 20°-45°, and defining an included angle between the axis of the servo and the Y plane to be 20°-45°.

2. The automatic swimming pool cleaning robot capable of lateral translation according to claim 1, wherein water level sensors are disposed at both a front end and a rear end of the housing.

3. The automatic swimming pool cleaning robot capable of lateral translation according to claim 1, wherein a pressure sensor is disposed on the control circuit, and an air detection hole is defined on a top of the controller compartment.

4. The automatic swimming pool cleaning robot capable of lateral translation according to claim 1, wherein a watertight plug connector is disposed on the housing, the controller compartment is electrically connected to a first end of the watertight plug connector, and a second end of the watertight plug connector is connected to a control terminal through a cable.

5. The automatic swimming pool cleaning robot capable of lateral translation according to claim 4, wherein the cable comprises a rotating cable, a rotor, a stator, a fixed cable, and a slip ring housing; the stator comprises a stator base and a first printed circuit board (PCB), the first PCB is disposed at a bottom of the stator base, and conductive ejector pins are disposed at a bottom of the first PCB; a fixed cable is sealingly disposed in the stator base, a first end of the fixed cable penetrates out of the stator and is connected to the control terminal, a second end of the fixed cable is electrically connected to the conductive ejector pins; the rotor comprises a rotor base, a second PCB, and a rotor limiting member; the second PCB is disposed on a top of the rotor base, conductive slideways are disposed on a top of the second PCB; a connecting member is sealingly disposed in the rotor base, the rotor limiting member is sealingly disposed at an end portion of the connecting member, the rotating cable is sealingly disposed in the connecting member, a first end of the rotating cable is electrically connected to the conductive slideways, a second end of the rotating cable penetrates out of the rotor limiting member and is connected to the watertight plug connector; the stator and the rotor are coaxially disposed, the conductive ejector pins are in contact with the conductive slideways, the slip ring housing is sleeved on outer walls of the stator and the rotor, the slip ring housing is sealingly and fixedly connected to the stator, and the slip ring housing is sealingly and rotatably connected to the rotor.

6. The automatic swimming pool cleaning robot capable of lateral translation according to claim 5, wherein the connecting member is filled with a filing material, and the stator base and the fixed cable are sealed through filing glue.

7. The automatic swimming pool cleaning robot capable of lateral translation according to claim 5, wherein the rotor limiting member is in a straight tube shape, and a top of the rotor limiting member extends outward and bends to form limiting clamping jaws, outer walls of the limiting clamping jaws are matched with an inner wall of the slip ring housing.

8. The automatic swimming pool cleaning robot capable of lateral translation according to claim 1, wherein the driving motor comprises two driving motors, the two driving motors are respectively disposed at two sides of the controller compartment, and the two driving motors respectively drive the crawler belts.

9. The automatic swimming pool cleaning robot capable of lateral translation according to claim 1, wherein the louver-type grille is disposed on each of the two water outlets.

\* \* \* \* \*